(12) United States Patent
Rao et al.

(10) Patent No.: US 10,595,242 B2
(45) Date of Patent: Mar. 17, 2020

(54) FEDERATED X2 GATEWAY

(71) Applicant: Parallel Wireless, Inc., Nashua, NH (US)

(72) Inventors: Prashanth Rao, Wilmington, MA (US); Pratik Mehta, Pune (IN); Kartik Shashikant Raval, Pune (IN); Kaitki Agarwal, Westford, MA (US); Rajesh Kumar Mishra, Westford, MA (US); Sridhar Donepudi, Nashua, NH (US); Anupam Goyal, Pune (IN); Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/642,544

(22) Filed: Mar. 9, 2015

(65) Prior Publication Data

US 2015/0257051 A1 Sep. 10, 2015

Related U.S. Application Data

(60) Provisional application No. 61/949,455, filed on Mar. 7, 2014, provisional application No. 61/976,146, filed on Apr. 7, 2014.

(51) Int. Cl.
*H04W 36/00* (2009.01)
*H04W 24/02* (2009.01)
(Continued)

(52) U.S. Cl.
CPC ... *H04W 36/0061* (2013.01); *H04W 36/0066* (2013.01); *H04W 36/14* (2013.01);
(Continued)

(58) Field of Classification Search
CPC ......... H04W 36/0066; H04W 36/0083; H04W 36/20; H04W 36/0072; H04W 92/02;
(Continued)

(56) References Cited

U.S. PATENT DOCUMENTS 7,849,213 B1 * 12/2010 Borghetti ............... H04L 63/20
707/609
8,824,430 B2 9/2014 Ioannidis
(Continued)

FOREIGN PATENT DOCUMENTS

CN 102958197 A 3/2013
EP 1560378 B1 11/2012
(Continued)

OTHER PUBLICATIONS

3rd Generation Partnership Project, 3GPP TS 136 423 V10.1.0 (Apr. 2011) LTE; Evolved Universal Terrestrial Radio Access Network (E-UTRAN); X2 Application Protocol (X2AP) (3GPP TS 36.423 version 10.1.0 Release 10), www.3gpp.org.*
(Continued)

*Primary Examiner* — George Eng
*Assistant Examiner* — Hung K Du
(74) *Attorney, Agent, or Firm* — Michael Y. Saji; David W. Rouille

(57) ABSTRACT

A gateway for X2 interface communication is provided, including: an X2 internal interface for communicating with, and coupled to, a plurality of radio access networks (RANs); and an X2 external interface for communicating with, and coupled to, a destination outside of the plurality of RANs, the X2 external interface further including a single X2 endpoint for the plurality of radio access networks, such that the X2 external interface provides a single interface for an external macro cell or core network to interact with the plurality of radio access networks. The gateway may further
(Continued)

include a handover module for maintaining X2 signaling associations and transactions for incoming and outbound handovers, including X2 to S1 and S1 to X2 translation.

19 Claims, 4 Drawing Sheets

(51) Int. Cl.
  *H04W 36/14* (2009.01)
  *H04W 48/16* (2009.01)
  *H04W 92/04* (2009.01)
  *H04W 92/20* (2009.01)
  *H04W 88/12* (2009.01)
  *H04W 84/18* (2009.01)
  *H04W 88/16* (2009.01)

(52) U.S. Cl.
  CPC ............ *H04W 48/16* (2013.01); *H04W 84/18* (2013.01); *H04W 88/16* (2013.01)

(58) Field of Classification Search
  CPC ... H04W 16/32; H04W 84/045; H04W 88/08; H04W 88/16; H04W 88/182; H04W 24/02; H04W 92/20; H04W 92/045; H04W 36/0055; H04W 4/005; H04W 92/00; H04W 80/04; H04W 84/18; H04L 12/66
  See application file for complete search history.

(56) References Cited

U.S. PATENT DOCUMENTS

| | | | |
|---|---|---|---|
| 9,510,256 B2 | 11/2016 | Krishna et al. | |
| 9,742,535 B2 | 8/2017 | Lorca Hernando | |
| 2010/0227603 A1 | 9/2010 | Gupta et al. | |
| 2011/0096687 A1* | 4/2011 | Dottling | H04W 24/02 370/252 |
| 2011/0105139 A1* | 5/2011 | On | H04W 16/10 455/453 |
| 2011/0110347 A1* | 5/2011 | Mun | H04W 16/02 370/338 |
| 2011/0151907 A1* | 6/2011 | Oh | H04W 72/0426 455/501 |
| 2011/0310791 A1 | 12/2011 | Prakash et al. | |
| 2012/0051275 A1 | 3/2012 | Alex et al. | |
| 2012/0063315 A1* | 3/2012 | Likar | H04L 47/14 370/235 |
| 2012/0122503 A1* | 5/2012 | Ma | H04W 16/10 455/501 |
| 2012/0163336 A1 | 6/2012 | Adjakple et al. | |
| 2012/0230232 A1* | 9/2012 | Ji | H04B 7/2656 370/280 |
| 2012/0263096 A1 | 10/2012 | Masini et al. | |
| 2013/0016657 A1* | 1/2013 | Muhanna | H04W 4/005 370/328 |
| 2013/0136074 A1 | 5/2013 | Okino | |
| 2013/0322390 A1* | 12/2013 | Xu | H04W 76/02 370/329 |
| 2014/0079026 A1 | 3/2014 | Dimou et al. | |
| 2014/0086120 A1 | 3/2014 | Mishra et al. | |
| 2014/0092765 A1 | 4/2014 | Agarwal et al. | |
| 2014/0204765 A1 | 7/2014 | Chai et al. | |
| 2014/0274061 A1* | 9/2014 | Yao | H04W 36/0094 455/436 |
| 2014/0308959 A1 | 10/2014 | De Benedittis et al. | |
| 2015/0063359 A1* | 3/2015 | Sella | H04L 45/42 370/397 |
| 2015/0109999 A1* | 4/2015 | Godin | H04W 92/20 370/328 |
| 2015/0215774 A1 | 7/2015 | Huang et al. | |
| 2015/0215927 A1* | 7/2015 | Amirijoo | H04W 16/10 370/329 |
| 2015/0257051 A1 | 9/2015 | Rao et al. | |
| 2016/0088470 A1 | 3/2016 | Sivavakeesar | |
| 2016/0105919 A1 | 4/2016 | Kawaguchi et al. | |
| 2016/0119941 A1 | 4/2016 | Ko et al. | |
| 2016/0142944 A1 | 5/2016 | Cao | |
| 2016/0165499 A1 | 6/2016 | Xu et al. | |
| 2016/0205060 A1 | 7/2016 | Gunnarsson et al. | |
| 2016/0227449 A1 | 8/2016 | Sivavakeesar et al. | |
| 2016/0255677 A1 | 9/2016 | Masini et al. | |
| 2017/0070923 A1 | 3/2017 | Li et al. | |
| 2017/0156086 A1 | 6/2017 | Tomici et al. | |
| 2017/0251412 A1 | 8/2017 | Xu et al. | |

FOREIGN PATENT DOCUMENTS

| | | |
|---|---|---|
| EP | 2345279 B1 | 5/2013 |
| EP | 2345279 A1 | 7/2013 |
| EP | 2816846 A1 | 12/2014 |
| WO | 2010068154 A1 | 6/2010 |
| WO | 2010147524 A1 | 12/2010 |
| WO | 2013107346 A1 | 7/2013 |
| WO | 2013153128 A2 | 10/2013 |
| WO | 2013189443 A2 | 12/2013 |
| WO | 2014069954 A1 | 5/2014 |
| WO | 2014207712 A1 | 12/2014 |
| WO | 2015199241 A1 | 12/2015 |
| WO | 2016141964 A1 | 9/2016 |

OTHER PUBLICATIONS

PCT International Search Report for PCT/US18/12852, dated Mar. 9, 2018.
PCT International Search Report for PCT/US17/54639, dated Jan. 19, 2018.
Third Generation Partnership Project, "3rd Generation Partnership Project; Technical Specification Group Services and System Aspects; 3GPP System Architecture Evolution (SAE); Security Architecture (Release 9)," 3GPP TS 33.401 V9.8.0 (Oct. 2015).
Peng Wang, Xiaojuan Zhang, "Local Gateway Assisted Handover Key Derivation in Enterprise Femtocell Network," Int. J. Communications, Network and System Sciences, 2015, 70-78.
Peng Wang, Xiaojuan Zhang, "Local Gateway Assisted Handover Key Derivation in Enterprise Femtocell Network", Apr. 2015, pp. 70-78, Scientific Research Publishing, Int. j. Communications, Network and System Sciences.
3rd Generation Partnership Project, 3GPP TS 32.593 v10.0.0 (Jun. 2010), "3rd Generation Partnership Project; Technical Specification Group Services and System Aspects; Telecommunication management; Home eNode B (HeNB) Operations, Administration, Maintenance and Provisioning (OAM&P); Procedure Flows for Type 1 Interface HeNB to HeNB Management System (Release 10)," 3rd Generation Partnership Project, Jun. 2010, V10.0.0, Section 6.2.3.
"Cisco ASR 5x00 Home eNodeB Gateway Administration Guide," Cisco Systems, Inc., Version 15.0, Sep. 30, 2013, obtained from http://www.cisco.com/c/dam/en/us/td/docs/wireless/asr_5000/15-0/15-0-HeNBGW-Admin.pdf.
Zahid Ghadialy, "Home e-NodeB Architecture in Release 8," The 3G4G Blog, (retrieved Mar. 1, 2015, 7:05 PM). http://blog.3g4g.co.uk/2009/03/home-e-nodeb-architecture-in-release-8.html.
European Telecommunications Standards Institute, ETSI TS 122 220 v11.6.0 (Sep. 2012), "Universal Mobile Telecommunications Ststem (UMTS); Service Requirements for Home Node B (HNB) and Home eNode B (HeNB) (3GPP TS 22.220 version 11.6.0 Release 11)," Sep. 2012, V11.6.0.
European Telecommunications Standards Institute, ETSI TS 136 423 v11.7.0 (Jan. 2014), "LTE; Evolved Universal Terrestrial Radio Access Network (E-UTRAN); X2 Application Protocol (X2AP) (3GPP TS 36.423 version 11.7.0 Release 11)," Jan. 2014, V11.7.0.
Ericsson & Alcatel-Lucent, "SCTP Concentrator: A Simple Solution to a Debated Problem," 3GPP TSG-RAN WG3 75, Feb. 6-10, 2012, Section 2.1 Logical Architecture, http://www.3gpp.org/ftp/tsg_ran/WG3_lu/TSGR3_75/docs/.
3rd Generation Partnership Project, 3GPP TR 37.803 v11.2.0 (Jun. 2013), "3rd Generation Partnership Project; Technical Specification

(56) References Cited

OTHER PUBLICATIONS

Group Radio Access Network; Universal Mobile Telecommunications Systems (UMTS) and LTE; Mobility enhancements for Home Node B (HNB) and Home enhanced Node B (HeNB) (Release 11)," 3rd Generation Partnership Project, Jun. 2013, V11.2.0, obtained from http://www.3gpp.org/DynaReport/37803.htm.

* cited by examiner

FEDERATED X2 GATEWAY

CROSS-REFERENCE TO RELATED APPLICATIONS

This application claims the benefit under 35 U.S.C. § 120 of U.S. Provisional App. No. 61/949,455, titled "Federated X2 Gateway," and filed Mar. 7, 2014, and of U.S. Provisional App. No. 61/976,146, titled "Federated X2 Gateway," and filed Apr. 7, 2014, each of which is hereby incorporated by reference herein in its entirety. This application also hereby incorporates by reference in its entirety U.S. application Ser. No. 14/034,915, titled "Dynamic Multi-Access Wireless Network Virtualization" and filed Sep. 24, 2013.

BACKGROUND

The Long Term Evolution (LTE) standard defines a interface, called the X2 interface, for communication between eNodeBs. The X2 interface supports user plane communications in the form of the X2-UP protocol, which is used to tunnel end-user packets between eNodeBs via GTP-U over IP or UDP as the transport layer protocol. The X2 interface also supports control plane communications via the X2-CP protocol, which is used to provide various functions over SCTP as the transport layer protocol. The X2-CP application layer protocol is X2AP.

The X2AP protocol provides the following functions, as described in 3GPP TS 36.423, hereby incorporated in its entirety: mobility management; load management; reporting of general error situations; resetting an X2 connection; setting up an X2 connection; eNodeB (eNodeB) configuration update; mobility parameter management; mobility robustness optimization; energy saving; X2 release; message transfer; registration; and removing an X2 connection. For example, X2AP can be used to facilitate user equipment (UE)-assisted network-controlled handovers and handovers without the involvement of a mobility management entity (MME).

However, as the number of eNodeBs increases, the number of point-to-point X2 connections between eNodeBs increases as the factorial of the number of nodes. This potentially results in a large volume of unwanted X2 signaling to perform basic coordination functions. A need exists for a system that can provide the benefits of X2 communications without these disadvantages.

The X2 interface generally defines a mechanism via which eNodeBs can directly interact with each other in order to perform functions like UE mobility management and load management effectively without involving the evolved packet core (EPC). The present disclosure describes how multiple internal eNodeBs managed within a virtual eNodeB may communicate with each other, and with eNodeBs outside of the virtual eNodeB, using the X2 interface.

SUMMARY

Figure 1:
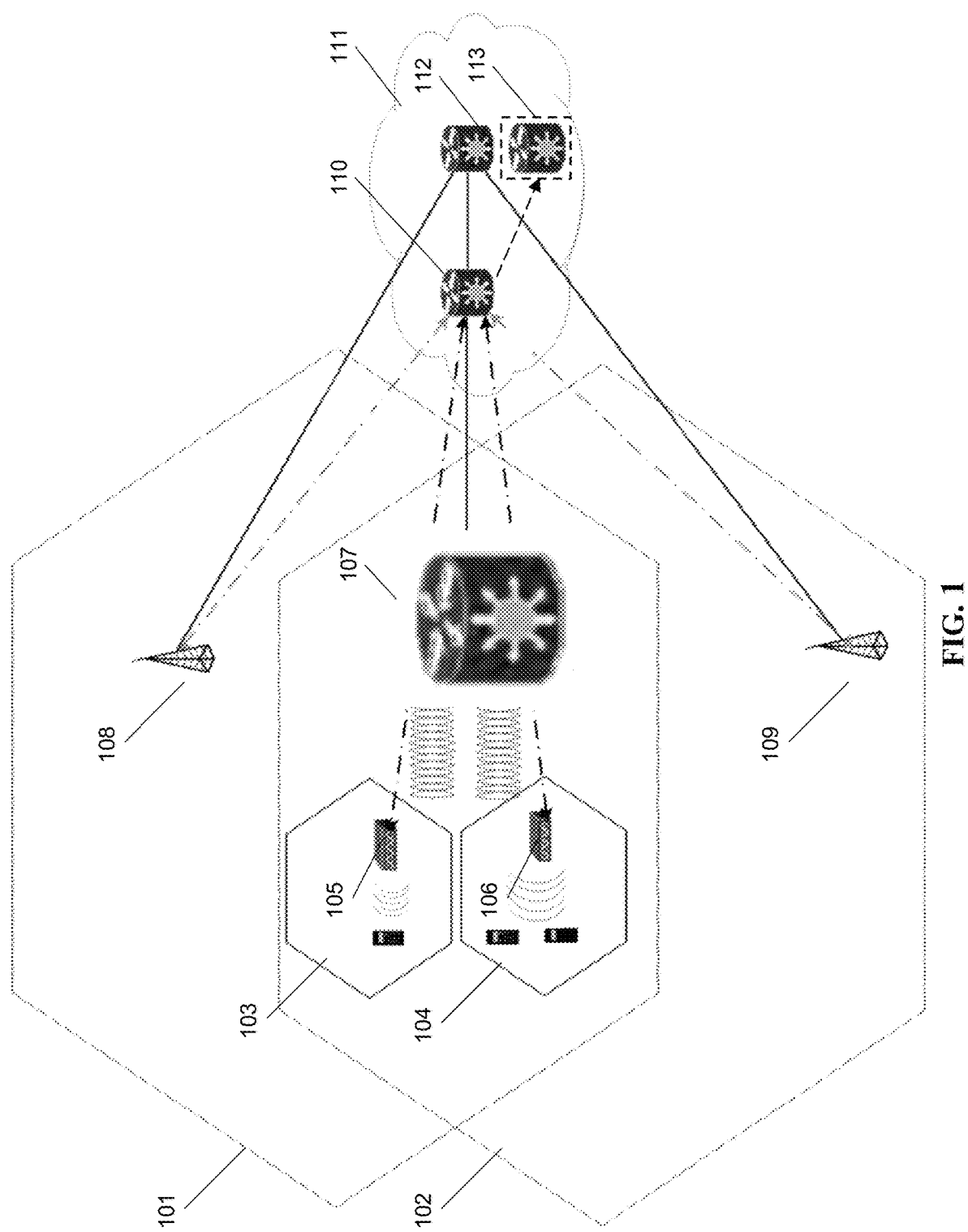
FIG. 1 is a schematic diagram of a Long Term Evolution (LTE) architecture, in accordance with some embodiments.

Systems and methods may be disclosed for providing gateway functionality for X2 interface communications.

In one embodiment, a gateway for X2 interface communication is provided, including: an X2 internal interface for communicating with, and coupled to, a plurality of radio access networks (RANs); and an X2 external interface for communicating with, and coupled to, a destination outside of the plurality of RANs, the X2 external interface further including a single X2 endpoint for the plurality of radio access networks, such that the X2 external interface provides a single interface for an external macro cell or core network to interact with the plurality of radio access networks.

The gateway may further include a handover module for maintaining X2 signaling associations and transactions for incoming and outbound handovers. The gateway may further include a self-organizing network (SON) module for determining whether to set up direct X2 connections between RANs that bypass the gateway. The gateway may further include an X2 mediation server that terminates X2 interfaces from multiple eNodeBs. The gateway may further include a management interface in communication with an upstream self-organizing network (SON) server configured to coordinate interference mitigation. The gateway may further include a self-organizing network (SON) module configured to discover a new X2 nterface and to discover a presence of a new RAN. The plurality of RANs may be eNodeBs or moving eNodeBs, and the gateway may further include a self-organizing network (SON) module configured to detect neighboring cells and configured to perform interference mitigation.

In another embodiment, a method for virtualizing X2 interface communication at an X2 gateway is disclosed, including: grouping two or more radio access networks (RANs) into a single individual X2 endpoint for X2 management; advertising a total number of neighbors at the X2 gateway calculated based on all neighbors seen by each of the two or more RANs and independent of a number of neighbors supported by any of the two or more RANs individually; and distributing neighbors individually associated with each of the two or more RANs based on network management parameters and physical proximity, wherein the X2 gateway is situated between the two or more RANs and a core network, thereby providing virtualized X2 interface communication between the two or more RANs and the core network.

The network condition criteria may also include relative signaling latency of a direct link between the two or more RANs and a link between the one of the two or more RANs and the cloud server. The method may also include: maintaining a neighbor table with all neighbors seen by each of the two or more RANs; sending different parts of the neighbor table to each of the two or more RANs; modifying the neighbor table to cause each RAN to receive a part of the neighbor table with a limited set of X2 entries independent of a number of neighbors seen by each RAN; and proxying X2 signaling between one of the two or more RANs and one of: another of the two or more RANs and a cloud server, based on network condition criteria. The method may also include causing X2 signaling to be performed between the two or more RANs without proxying. The method may also include dynamically changing advertised load information at a scheduled maintenance time for preventing incoming handovers to RANs scheduled for maintenance downtime. The method may also include converting X2 handover requests to S1 handover requests. The method may also include maintaining a management table of a relationship, a topology, and a geographic location of each of the two or more RANs, and sending X2 interface messages to update the management table. The method may also include receiving messages from the two or more RANs with one of management information and real-time interference mitigation information. The method may also include encrypting a link between the X2 gateway and the two or more RANs. The method may also include authenticating each of the two or more RANs to determine whether a connection to the X2 gateway is authorized. The method may also include: requesting utilization information from the two or more RANs; generating resource utilization analytics for the two or more RANs; and managing resource utilization for the two or more RANs, wherein utilization information is at least one of backhaul capacity, access network capacity, a number of connected mobile devices; and a number of active connected mobile devices.

In another embodiment, a system for X2 interface communication is disclosed, including: two or more radio access networks (RANs); and an X2 gateway situated between the two or more RANs and a core network, the X2 gateway further including instructions that, when executed at the X2 gateway, cause the X2 gateway to perform: grouping the two or more RANs into a single individual X2 endpoint for X2 management; advertising a total number of neighbors at the X2 gateway calculated based on all neighbors seen by each of the two or more RANs and independent of a number of neighbors supported by any of the two or more RANs individually; and distributing neighbors individually associated with each of the two or more RANs based on network management parameters and physical proximity, thereby providing virtualized X2 interface communication between the two or more RANs and the core network.

In another embodiment, a system for X2 interface communication is disclosed, including: two or more radio access networks (RANs); and means for providing a single X2 endpoint for an external macro cell or core network to interact with the two or more RANs, thereby providing virtualized X2 interface communication between the two or more RANs and the core network.

DETAILED DESCRIPTION

Overview

The systems and methods described herein may integrate with an LTE network system. In the LTE architecture, a radio access network (RAN) provides access to mobile devices, known as user equipments (UEs), using the E-UTRA radio air interface. Various frequency bands are supported, with the use of the common E-UTRA waveform. The RAN is provided by base stations, which are called eNodeBs (eNodeBs). eNodeBs communicate via an all-IP network to an evolved packet core (EPC), which typically includes a mobility management entity (MME), for supporting mobility to UEs; a serving gateway (GSW), for routing and forwarding user data packets and for providing the mobility anchor for UEs; a packet data network gateway (PDN gateway or PGW), for providing connectivity to and from any external data networks such as the Internet; and various other network nodes that provide user subscriber data, security functions, and lawful intercept capability. LTE is further defined by the 3rd Generation Partnership Project organization (3GPP.org). Specific technical standards that relate to the content herein are referred to below by their 3GPP technical standard reference number. The systems and methods disclosed herein may also integrate with other non-LTE network systems, including 3G, 4G, 5G, Wi-Fi, and other systems, in some embodiments.

In some embodiments, special eNodeBs connect to a virtualization/federation server in an EPC via a wireless backhaul mesh network. The special eNodeBs may be identified herein as UniRANs, and may have two wireless radios, allowing one wireless radio to be used for access and the other wireless radio to be used for backhaul, which may be using a different radio access technology, i.e., the special eNodeBs may be multi-RAT eNodeBs. Each multi-RAT eNodeB can connect to each other via direct wireless link, rather than using a communication path going through the EPC. This eases the requirement on the backhaul link up to the data center. In some embodiments, the special eNodeBs may be eNodeBs in a mesh network, with one or more of the eNodeBs providing backhaul capability for the others.

In some embodiments, the eNodeBs may connect to the EPC via a virtualization/federation server, or cloud coordination server, identified herein as a UniCloud or LTE access controller (LAC) server. The cloud coordination server may provide virtualization to allow one or more eNodeBs to be federated into a single "virtual eNodeB." Various aspects of the functionality of the eNodeBs may be virtualized by the virtualization server, as further described in U.S. application Ser. No. 14/034,915, titled "Dynamic Multi-Access Wireless Network Virtualization" and filed Sep. 24, 2013. This disclosure addresses X2 interface virtualization by the virtualization server.

In some embodiments, neighbor RANs may establish X2 connections between each other. In addition, each RAN establishes an X2 connection with the virtualization server as its neighbor. Their X2 connection with the virtualization server acts as a default X2 connection for all handovers to and from the operator core network. In other words, the virtualization server acts as an intelligent X2 aggregation and proxy for connections to and from the core network.

In some embodiments, the virtualization server may be thought of as providing two distinct views onto the network, an external view and an internal view. The first view is provided to network nodes external to the virtualized RAN, including to other macro cells and to the core network. In the first view, the virtualization server represents itself to the core network as a single virtual eNodeB with many cells, and as a transparent core network proxy to the physical eNodeBs connected to the virtualization server on the RAN side. In this view, macro eNodeBs and other core network-side network nodes may access the RAN-side eNodeBs via the virtualization server as a gateway, but when accessing these RAN-side eNodeBs, they may send messages to the virtualization server using the virtualization server's eNodeB ID and the cell ID of the RAN-side eNodeB. This may be thought of as a cell-centric view of the network.

In the second view, internal to the virtualized RAN, the eNodeBs within the virtualized RAN may see themselves as eNodeBs and may communicate among each other as X2 nodes. However, when sending or receiving communications to nodes external to the virtualized RAN, the eNodeBs may communicate through the virtualization server, as a gateway. The virtualization server may transparently proxy X2 signaling from nodes external to the virtualized RAN to the eNodeBs within the virtualized RAN by translating the nodes' eNodeB IDs into cell IDs, and vice versa. In some embodiments, private X2 routing may be provided between nodes within the virtualized RAN, such that X2 messages are routed from node to node, either directly or via the virtualization server, without being directed to the core network, including multi-hop routing from an original eNodeB to another eNodeB unreachable directly from the original eNodeB.

Thus, in some embodiments, the virtualization server serves as a gateway between the internal RAN-side network and the external core network-side network. The virtualization server may route or pass traffic from one network to the other network. In the process of doing so, the virtualization server may perform address translation, in some embodiments, or may serve as an endpoint and proxy for X2 connections. The virtualization server may identify which eNodeB on the RAN side of the network may receive a given X2 connection or packet, using various means, such as packet inspection and envelope inspection, and especially by inspecting the envelope of a given packet for an identifier derived from an E-UTRAN cell global identifier (ECGI) of the target eNodeB.

This is similar to virtualization of eNodeBs for purposes of federating S1 interface communications, as described in U.S. patent application Ser. No. 14/034,915, titled "Dynamic Multi-Access Wireless Network Virtualization" and filed Sep. 24, 2013. However, in some embodiments, the S1 interface may be terminated on a different coordination server from the X2 gateway server.

In some embodiments, each virtualization server may represent itself to the core network as a single eNodeB with up to 256 cells connected to it, each with its own unique eNodeB cell global identifier (ECGI) forming up to 256 cells. The ECGI in LTE is a code with 15 decimal digits, where the first five digits are a mobile country code and/or mobile network code, followed by a 7-digit prefix based on the eNodeB ID, and then a 3-digit suffix based on the cell ID. In some embodiments, since the cell ID is used by the virtualization server to route messages, the number of eNodeBs that can be virtualized may be limited by the 3-digit cell ID suffix. The virtualization server may route each incoming X2AP global procedure to the correct eNodeB on the internal network based on the target ECGI present in the message. The virtualization server may maintain a mapping between cell ID suffixes and eNodeB identifiers at the virtualization server. In the LTE protocol, eNodeBs are responsible for assigning cell IDs to each of their own cells. In some embodiments, the virtualization server may thus use a virtual eNodeB ID as its eNodeB ID, and may assign cell IDs to each of the cells served by each of the RANs within its private network.

In some embodiments, the virtualization server routes each incoming mobility message based on the eNodeB UE X2AP ID. For mobility/handover, X2 messages can be mapped into corresponding S1 handover messages or a standard X2 handover may be used. For the handovers originated by macro eNodeB, the virtualization server may internally proxy the X2 connection towards the appropriate eNodeB internal to the network. On the reverse path of handovers, X2 handovers initiated by each internal eNodeB are appropriately directed to the macro. The mobility management aspect thus supports UE-assisted network-controlled handovers of the UEs. Using the X2 interface, handovers may be facilitated inside and outside of the virtual eNodeB network without involvement of MME.

Advantages

Various advantages of embodiments of the disclosed systems and methods are now described. These advantages may apply to one or more of the disclosed embodiments, and are not intended to limit the invention to embodiments that have one or more of these advantages. Features that may be provided in certain embodiments in conjunction with the provided advantages are also described in the below section.

One advantage of this architecture is that nodes in the external network, such as core network nodes and other macro eNodeBs in the external network (for X2 interface communications), may be able to establish a single X2 connection with the virtualization server to communicate with all of the RANs. This can save complexity on the macro eNodeB. This may be called the "$n^2$ problem," because if each of n nodes is configured to communicate with each of the other n nodes, $n^2$ communications links are required. By using a virtualization server, federation of links is enabled, thereby reducing the number of required links.

Another advantage is that, in some embodiments, an X2 virtualization gateway may be used to resolve vendor differences in X2 protocol implementations. While the X2 protocol is standardized, vendors can and do extend the protocol with features that other vendors do not support. In a multi-vendor heterogeneous network, the use of an X2 virtualization gateway can provide a way for equipment from multiple vendors to interoperate. As an example of an architecture that is enabled by the present disclosure, each vendor could have its own network, populated with its own equipment. The vendor-specific networks could be bridged by using one or more X2 protocol gateways to provide anchoring, bridging, and interworking from one X2 protocol version to another. Such a network environment may also have advantages for multi-carrier deployments.

Another advantage is that, in some embodiments, when establishing X2 to a small cell or eNodeB in the internal network from a macro cell in the external network, the macro queries an MME for the destination IP or looks up its own X2 configuration info. In this case, the MME or macro needs to know only the IP address of the virtualization server, without having to worry about how many small cells are deployed in a changing landscape, even if the number of eNodeBs in the internal network is variable. The virtualization server knows how to route the X2 requests coming into the network. The MME can resolve any X2 transport network layer (TNL) configuration info requests from the macro network by looking up a destination IP (UniCloud X2 endpoint) using the short eNodeB identifier embedded in the ECGI present in the X2 TNL configuration info request as the look-up key.

Another advantage is that, in some embodiments, when establishing an X2 connection from a small cell or eNodeB in the internal network to a macro cell in the external network, each small cell does not need to be provisioned with X2 destination info. The virtualization server may establish X2 on behalf of the small cells. Another advantage is that, in some embodiments, the virtualization server hides the effects of small cells coming in and out of service. When small cells are out of service temporarily, the virtualization server can reduce disruption in this situation. In one embodiment, the virtualization server may, in this situation, send an X2AP error indication message to a requester, such as a macro eNodeB outside of the internal network, rather than bouncing the underlying SCTP links.

Another advantage is that, in some embodiments, the virtualization server can initiate appropriate X2 connections between small cells or eNodeBs internal to the network and macro cells external to the network based on non-X2AP information, such as global positioning system (GPS) coordinates of macro and small cell, special X2 capabilities of the macro, or other characteristics of either the small cells and macro cells.

Another advantage is that, in some embodiments, the virtualization server can peek into X2 messaging and implement proprietary algorithms involving a cluster of neighboring small cells instead of just the one that is the target of a given X2 message. This can be particularly helpful in shared carrier operation, when multiple core networks are supported on the network external to the gateway. As well, the virtualization functions described herein may be particularly useful for small cells, as many small cells may be jointly managed within the coverage area of a single macro cell.

Another advantage is that, in some embodiments, standby small cells may be deployed and physical replacements, upgrades, and/or maintenance of small cells may be performed in a non-disruptive manner, as standby units can take over, at the gateway or facilitated by the gateway, an existing logical X2AP protocol connection over the X2 interface to the macro with minimal disruption.

Another advantage is that, in some embodiments, provisioning becomes simpler. As mentioned in FIG. 1, the X2 interface is traditionally used between neighboring eNodeBs to exchange LTE protocol messages to coordinate handoff and perform interference mitigation. While that approach works, maintaining/provisioning an X2 interface may happen each time a new eNodeB is added into the network, resulting in a large volume of messages when a new eNodeB is added. These messages may become unnecessary when using an X2 federation server.

Another advantage is that, in some embodiments, the reduced volume of X2 setup messages may aid in using X2 messages to perform interference mitigation. In some embodiments, real time SON optimization may be performed across the multiple eNodeBs internal to the network.

Features

In order to facilitate the above effects and benefits, the virtualization server may have, in some embodiments, one or more of the following features.

In some embodiments, the virtualization server may act as a terminating X2 proxy server, such that it terminates an internal and an external X2 interface such that external macros see one (or more) X2 endpoint instead of many eNodeBs. In some embodiments, the virtualization server may act as a network address translation (NAT) proxy for translating IP addresses, eNodeB IDs, cell IDs, and other identifiers from the core network side (external side) of the network to the RAN side (internal side), and vice versa.

In some embodiments, the virtualization server may incorporate a cell tracking table, for mapping eNodeBs, eNodeB IDs, cell IDs, and other RAN-side network information relating to the RAN side of the network to and from a eNodeB cell global identifier (ECGI) identifier usable by the core network and external network.

In some embodiments, the virtualization server may act as a virtual eNodeB, hosting up to 255 or more cells on a single eNodeB ID from the perspective of the core network. This may include virtualizing functions of the eNodeBs inside the RAN side of the network, hiding functions of the RAN side of the network, and summarizing information pertaining to the internal network to the core network. This may also include providing standard eNodeB interfaces to the external network and core network. This may also include terminating certain functions, such as X2 interface connections, between eNodeBs within the virtual eNodeB, and not sending these control connections outside the RAN side of the network.

In some embodiments, the virtualization server may maintain X2 signaling associations/transactions for inbound and outbound handovers.

In some embodiments, the virtualization server may coordinate Wi-Fi meshing with inputs from LTE SON intelligence, dynamically enabling X2 between eNodeBs internal to the gateway where it makes sense to use X2 instead of S1.

In some embodiments, the virtualization server may group a subset of RANs into individual X2 endpoints to allow better X2 management. For example, the total number of neighbors advertised by the virtualization server on its X2 interface may include all neighbors seen by all RANs internal to the gateway. If this number exceeds the number supported by the X2 peers connecting to the virtualization server, the virtualization server can reduce the number by using grouping. In some embodiments, the virtualization server can distribute the neighbors based on SON and physical proximity.

In some embodiments, the virtualization server may create, manage, collate, advertise, publish, and/or distribute a neighbor table on behalf of all RANs it is providing virtualization and gateway services for. This table may then be pushed, in whole or in part, to one or more of the RANs. In some embodiments, this table may be manipulated so that each RAN sees a particular limited set of X2 entries independent of the real number of RAN neighbors it has. For example, for a small number of nodes, nodes with close adjacency, geographic proximity, or low latency may be permitted to see each other and to establish direct X2 protocol links, in some embodiments. As the number of nodes goes up, it is desirable for fewer direct X2 protocol links to be enabled, so in some embodiments the number of nodes and the degree of proximity of nodes to each other may be used to determine which nodes may be permitted to see each other and establish links with each other. The X2 neighbor table may be created based on this computation and distributed to individual nodes accordingly. As nodes are added or moved, X2 links that are already active may or may not be transitioned from direct links to indirect links. This is facilitated by the use of a virtualization server that has a bird's eye view of all nodes on the network.

In some embodiments, the virtualization server may permit inter-RAN X2 signaling internal to the private network to be performed directly. In some embodiments, the virtualization server may permit inter-RAN X2 signaling to be proxied via the virtualization server, or may cause X2 connections to start at the virtualization server before being reassigned to be completed directly, based on criteria like comparative signaling latency between the direct link versus a link via the virtualization server. In some embodiments, direct inter-RAN X2 may be used for faster handoffs independent of the virtualization server.

In some embodiments, the virtualization server may dynamically change advertised load information to prevent incoming handovers to RANs scheduled for maintenance downtime.

In some embodiments, the virtualization server may use a domain name service (DNS) for resolving an M-eNodeB IP directly using the G-eNodeB-ID via a DNS server. This mechanism can be used instead of TNL discovery by the virtualization server.

In some embodiments, the virtualization server may permit the use of NoRemove, NoHO and the NoX2 attributes per ANR table entry.

In some embodiments, the virtualization server may perform X2 to S1 protocol message conversion for efficient handover.

In some embodiments, X2 associations may be released. The X2 association between a mesh eNodeB, the virtualization server and a macro eNodeB can be released based on one or more of the following triggers: automatic neighbor relations (ANR) or neighbor relations table (NRT) table entry aging timer expiration; explicit execution of a command-line, NETCONF, or web-based command to remove the association; or the removal of a configured macro eNodeB peer.

In some embodiments, multiple virtualization servers may be supported. Each virtualization server may treat the other virtualization server as a macro eNodeB with a maximum of 255 cells, depending on the specific mesh eNodeBs attached to either. The virtualization servers may exchange the list of eNodeBs during X2 setup. Each virtualization server may be an X2 endpoint. Using multiple virtualization servers may allow a multiple of 255 cells to be supported. Additionally, X2-X2 bridging may be supported between the multiple virtualization servers. Using an X2 protocol connection and no additional protocol changes, a small cell eNodeB within one X2 virtualization network zone may be able to establish an X2 protocol connection with another small cell eNodeB within a second X2 virtualization network zone, just as if communicating using X2 between a small cell eNodeB within a single X2 virtualization network and a macro eNodeB.

In some embodiments, inter-cell interference coordination (ICIC) may be provided. For example, for ICIC within the connected mesh eNodeBs (i.e., within the gateway or private network), fractional frequency reuse (FFR) might be used across mesh eNodeBs controlled by a single virtualization server. Each mesh eNodeB may provide some measurements or statistics to the SON module at the virtualization server, which may then run appropriate processes and adjust mesh eNodeB channel/scheduling properties. This feature is independent of any macro eNodeB interaction in terms of X2AP messaging.

Compared with Generic Proxy and HeNodeB-GW

3GPP has X2 proxy functionality in a network node called the Home eNodeB gateway (HeNodeB-GW). The HeNodeB-GW is designed to be placed in a user's home, and is designed to provide connectivity to and from the core network and/or other macro eNodeBs to a home eNodeB (HeNodeB) in the home, and includes proxy capability. Such HeNodeB-GWs are described in more detail in 3GPP Rel. 10 TR 37.803, which is hereby incorporated herein in its entirety.

However, the X2 virtualization server and gateway described herein are unlike the 3GPP Home eNodeB gateway (HeNodeB-GW). Specifically, in some embodiments, the X2 interface and associated protocols are understood by 3GPP to be between two eNodeBs. The HeNodeB-GW operates in such a manner, so that any eNodeBs on the core network side of the gateway may have direct access to the HeNodeB as a full-fledged eNodeB. When multiple HeNodeBs are present, each is available via X2 to any eNodeB outside of the private network for a direct connection. By contrast, the virtualization server described herein does not provide direct access to X2 interfaces at eNodeBs within the private RAN side of the network. Instead, the virtualization server presents a virtual eNodeB endpoint, interrupting X2 connections as they pass through the gateway, and providing address translation, X2-S1 protocol translation, node hiding and signal masking for signals that do not need to be transmitted outside of the private RAN network, while permitting direct X2-to-X2 connections between RANs inside the private RAN network.

In some embodiments, this may be thought of as a translation proxy, similar to the type of proxy used for network address translation (NAT) gateways. A NAT gateway provides access to the public Internet to a number of network nodes on a private network. The nodes on the private network each have IP addresses that are only valid on the private network. When packets are sent or received between the private network nodes and a network node on the public Internet outside of the NAT gateway, the NAT gateway rewrites the packets with a public IP address so that from outside the NAT gateway, all nodes within the network share the same IP address. The NAT gateway uses envelope information to determine which internal node may be the recipient of a given packet from outside the network.

In some embodiments, this may also be thought of as a virtual eNodeB with many cells, with the cells distributed among one or more eNodeBs that are managed by the virtual eNodeB. The virtual eNodeB is able to assign cell IDs for each of the cells managed by its internal eNodeBs. The virtual eNodeB is also able to provide access by the core network to each of these cells when an X2 connection is needed, such as an X2 handover request to a particular cell. Since cell-based X2 communications are a common case, the virtual eNodeB provides simplified management, as well as the other advantages described above, without significantly limiting access to the eNodeBs within the private RAN network. The X2 TNL is exposed at the virtual eNodeB for eNodeBs outside the private network, and this TNL is shared appropriately with each of the eNodeBs within the private RAN network.

Network Architecture

FIG. 1 is a schematic diagram of a Long Term Evolution (LTE) architecture, in accordance with some embodiments. Cell 101 is served by macro eNodeB 108. Cell 102 is served by macro eNodeB 109. Cell 103 is served by small cell eNodeB 105, which is a multi-radio access technology (RAT) mesh eNodeB. Cell 104 is served by small cell eNodeB 106, which is a multi-radio access technology (RAT) mesh eNodeB. Small cell eNodeBs 105, 106 are served for backhaul by wireless backhaul gateway eNodeB 107. Small cell eNodeBs 105, 106 and gateway eNodeB 107 are coupled to LTE access controller 110, which is a virtualization server and gateway; these nodes are considered to be within the gateway. Macro eNodeBs 108, 109 are also coupled to LTE access controller (LAC) 110, outside of the gateway. Macro eNodeBs 108, 109 and LAC 110 are coupled to mobility management entity (MME) 112. LAC 110 is optionally coupled to upstream self-organizing network (SON) server 113. MME 112 and LAC 110 and SON server 113 reside in core network 111. Dotted lines indicate X2 connections and solid lines are S1 connections, except for the dotted line shown connecting LAC 110 and SON server 113, which reflects optional data flow. In some portions of this disclosure, an eNodeB within the gateway may be referred to as a mesh eNodeB, small cell, or a converged wireless system (CWS).

In the network depicted in FIG. 1, small cell 103 is a neighbor to macro cell 101. This relationship may be identified in an X2 setup request or response message, either from mesh eNodeB 105 or macro eNodeB 108 to LAC 110. Whether the X2 message is received from mesh eNodeB 105 or macro eNodeB 108, if one eNodeB identifies the other as a neighbor, it implies that the relationship is associative, i.e., that the other eNodeB has the same neighbor relationship.

All the neighboring eNodeBs establish X2 connectivity between each other. When there are many small cells covering a given area, they may need X2 connectivity between them as shown above. In addition, a nearby macro eNodeB may establish X2 connectivity with many of the nearby small cells. S1 connections are point-to-point, i.e. one eNodeB has to establish only one S1 connection with the EPC (MME 112, as shown in FIG. 1). However, X2 connectivity is multi-point, such that each eNodeB 105, 106, 108, 109 may form an X2 connection with each other eNodeB. Moreover, X2 connections require an IP path between two eNodeBs. In one common deployment scenario in the prior art, each eNodeB has its point-to-point backhaul going up to a central data center that hosts the security gateway/EPC. That means the X2 IP path is also via the central data center. Due to increase in rate of handovers in small-cell deployment, the X2 IP path can put significant bandwidth requirement on the existing backhaul. This will not occur in the configuration depicted in FIG. 1 because no X2 connection is established between nodes 103, 108 and 104, 109.

Figure 2:
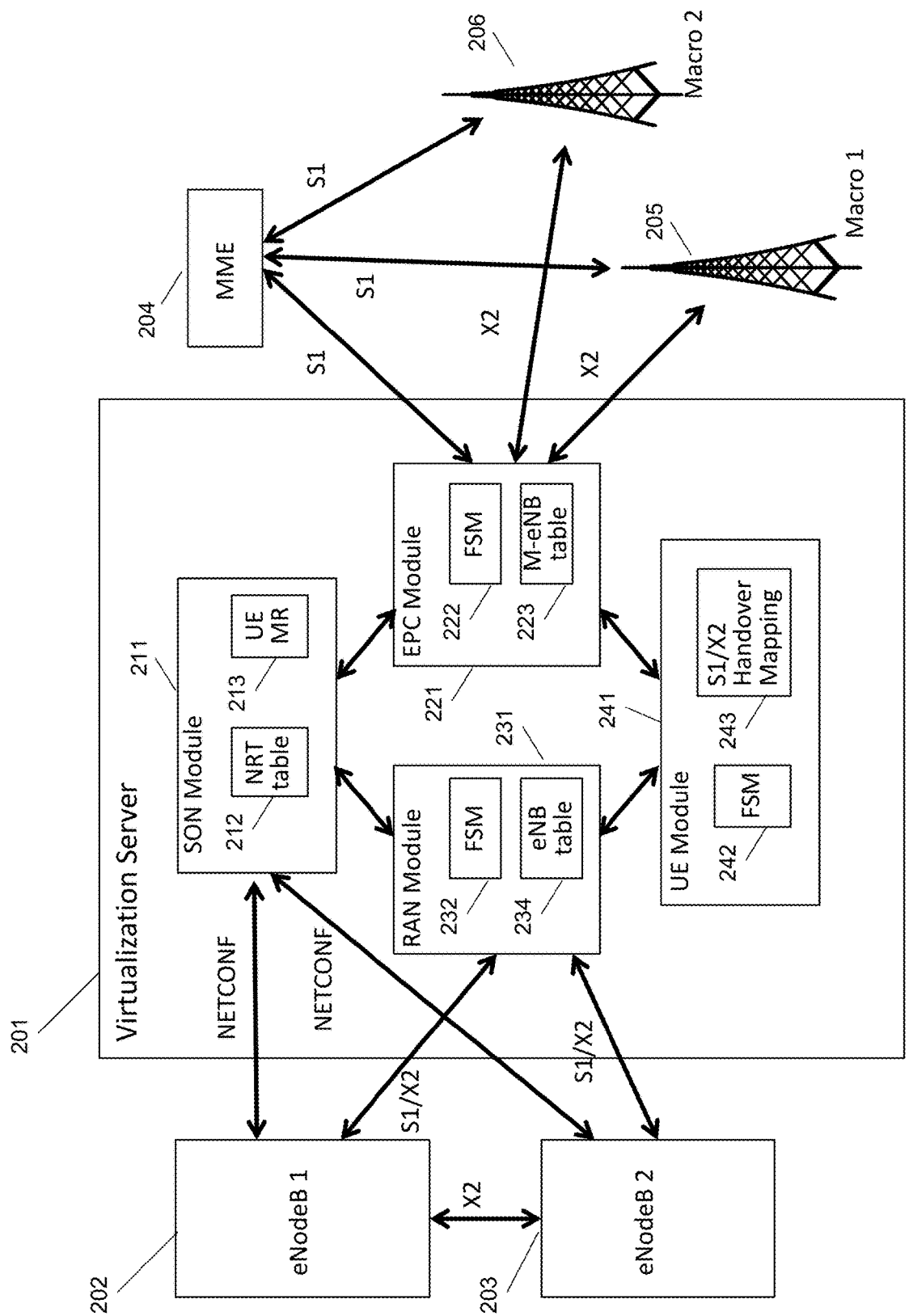
FIG. 2 is a schematic diagram of a virtualization server in a Long Term Evolution (LTE) architecture, in accordance with some embodiments.

FIG. 2 is a schematic diagram of a virtualization server in a Long Term Evolution (LTE) architecture, in accordance with some embodiments. Virtualization server 201 provides services to, and is coupled to, eNodeB 1 202 and eNodeB 2 203, on a RAN side of a network (i.e., inside of the gateway). Virtualization server 201 provides services to, and is coupled to, MME 204, macro eNodeB 205, and macro eNodeB 206, on a core network side of the network (outside of the gateway). Virtualization server 201 corresponds to LAC 110, in some embodiments.

Within virtualization server 201 are self-organizing network (SON) module 211, containing neighbor relation table (NRT) 212 and UE measurement report processing module 213; evolved packet core (EPC) module 221, containing EPC finite state machine module 222 and macro eNodeB table 223; radio access network (RAN) module 231, containing eNodeB finite state machine module 232 and eNodeB table 234; and user equipment (UE) module 241, containing UE finite state machine module 242 and S1/X2 handover mapping table 243. In some embodiments, SON module 211 may perform NRT maintenance, load information processing and fractional frequency reuse (FFR) processing; RAN module 231 may perform X2 association management with eNodeBs 202, 203; EPC module 221 may perform X2 association management with macro eNodeBs 205, 206; and UE module may perform X2 handover and S1/X2 translation between eNodeBs 202, 203 and macro eNodeBs 205, 206. Finite state machine modules 222, 232, 242 may include one or more states for modeling the operational state of a connected EPC, UE, or RAN, respectively. More than one FSM may be present at each of modules 221, 231, 241, so that virtualization server 201 may be enabled to model the operational state of several network nodes at once. All the above managers/modules interact with each other to accomplish the assigned functionality.

In some embodiments, virtualization server 201 may include one or more processors, each with one or more processor cores. Each of modules 211, 221, 231, and 241 are coupled to each other within virtualization server 201, and may execute on one or more shared processors (not shown) coupled with memory (not shown). Virtualization server 201 may include a real-time operating system, such as a Linux operating system, and may include an operating system that distributes tasks among multiple cores. Virtualization server 201 may provide one or more of modules 211, 221, 231, 241 as processes, threads, user-mode or kernel-mode processes, processes in hardware or in software, in some embodiments. In some embodiments, each of modules 211, 221, 231, 241 may execute on the same virtualization server 201; in other embodiments, these modules may execute on remote machines connected via a network. In some embodiments, a remote failover virtualization server (not shown) may be made available for handling failures at virtualization server 201. The failover mechanism may involve checkpointing operations at virtualization server 201 in each of the modules therein. Certain operations may be hardware accelerated, such as network processing tasks, IPsec tasks, deep packet inspection tasks, or other tasks.

Virtualization server 201 may include one or more network interfaces; these network interfaces may include Ethernet (10/100/1000/10000 Mbit) interfaces, Wi-Fi (802.11a/b/g/n/ac/af/ad) interfaces, 3G or 4G interfaces, virtual interfaces, or other interfaces. In some embodiments, one network interface may be directed towards the core network and located at, or coupled to, EPC module 221; this interface would communicate using the S1 protocol to MME 204 and using the X2 protocol to macro cells 205, 206. In some embodiments, another network interface may be directed towards one or more RANs internal to the gateway and connected to RAN module 231, for communicating to RANs 202, using either S1 or X2 as appropriate. Translation or interworking of protocols may occur at one or more of modules 211, 221, 231, or 241 as appropriate. In some embodiments, SON module 211 may also be coupled to an interface for communicating with RANs 202, 203; this interface may be labeled the SON interface, and the NETCONF protocol (XML over HTTPS) may be used to communicate in a proprietary or non-proprietary manner with RANs 202, 203 regarding network configuration, orchestration, and coordination operations.

SON Functions

In order to do intelligent selection of a particular mesh eNodeB, the virtualization server 201 may build and maintain a neighbor relation table that maps the neighbor macro cells of a mesh eNodeB cell. In the uplink direction, the table can be built based on UE measurement reports that identify the neighbor cells of each mesh eNodeB. These measurements may be reported to SON module 211. Similarly, in the downlink direction, the neighbor/target cell information received in X2 Setup Request and Load Information messages can be used to map neighbor mesh eNodeBs for a particular macro. This table can be maintained by SON module 211 and referenced by other modules to make intelligent downlink X2 message forwarding decisions towards the mesh eNodeB. Each NRT entry may have an associated age and may age out appropriately, possibly leading to existing X2 associations being torn down upon age out of an entry.

In some embodiments, modules 221, 231, 241 may be concerned with maintaining the X2 associations and/or the SCTP pipes, and may not be concerned with cell level information. So, triggers for creation/update/deletion of X2 associations may come from the SON module based on changes in the NRT.

In some embodiments, SON module 211 may perform neighbor relations table (NRT) maintenance. The NRT may be dynamically built based on triggers from mesh eNodeB when a Macro cell is detected so that load information can be applied to the mesh eNodeB cells that are actual neighbors of the macro cell and not to all mesh eNodeB controlled by LAC. SON module 211 may maintain a neighbor relation table (NRT) of the following format, shown below as TABLE 1. This table may be updated based on the UE measurements indicating a new neighbor cell.

TABLE 1

| CWS Cell ECGI | Macro Cell ECGI | Macro TAI List | Macro PLMN List | PCI | X2 Association | Age Timer (Minutes) |
|---|---|---|---|---|---|---|
| C1 | M1 | TAI2 | P1, P2 | | Yes | 10 |
| C1 | M2 | TAI2 | P1, P2 | | Yes | 30 |
| C1 | M3 | TAI3 | P3 | | No | 60 |

In some embodiments, SON module 211 may also maintain another table, shown below as TABLE 2, for mapping Macro Global eNodeB Id to corresponding served cells and neighbors as received in X2 Setup Response.

TABLE 2

| Macro G-eNB-ID | Served Cell List ECGI | Neighbor Cell List | Age Timer (minutes) |
|---|---|---|---|
| G2 | M1, M2 | N1, N2, C1 | |
| G3 | M3, M4 | N3, C4 | |

In some embodiments, SON module 211 may be able to encode/decode X2 messages in abstract syntax notation (ASN) format. In some embodiments, virtualization server 201 may have a single X2AP module for message processing, or multiple modules divided among modules 211, 221, 231, 241. Alternatively, the X2AP functionality in virtualization server 201 may be limited to basic validity checks and fault handling.

In some embodiments, SON module 211 may perform TNL discovery over the S1 and/or X2 interfaces. Since TNL discovery is optional, the virtualization server may have provision to configure Macro e-NB addresses to be used for X2 endpoints. Configuration to define any mappings between G-eNodeB-ID and X2 IP addresses may be present, in some embodiments.

TNL discovery for macro eNodeB based on G-eNodeB-ID not configured at the virtualization server may be provided, in some embodiments. Corresponding mapping table may be maintained by virtualization server 201 and updated dynamically. ANR table maintenance may be centrally controlled by the virtualization server. In some embodiments, DNS may be supported for TNL forwarding to the MME that supports the TAI connected to the LAC, and also for resolving the M-eNodeB IP directly using the G-eNodeB-ID via a DNS server.

In some embodiments, an intelligent ANR table maintenance may allow advertising actual ANR table, and neighbor cells to Macro. Since an eNodeB is allowed 256 cells, the macro eNodeB may be able to process 256 cells, although in practice it might be configured to process a lesser number of neighbor cell information.

In some other embodiments, only a set of cells that are neighbors of the requesting macro, or a configurable number of cells, may be advertised to the macro, in some embodiments. The X2 Setup Request neighbor information field could be used for this information.

In some embodiments, SON module 211 may be able to perform other self-organizing network functionality. For example, SON module 211 may perform load information processing, fractional frequency reuse processing, power and interference mitigation processing, or other processing. SON module 211 may assess current power, signal quality, or interference parameters derived from UE measurement report processing module 213. UE measurement reports may be received from a UE at eNodeB 202 or 203, sent via S1 or X2 to RAN module 231, and then passed to SON module 211.

In any given call flow or message exchange, each module 222, 232, 242 may independently track the state of the core network/macro eNodeB, the internal eNodeB, and the UE, in some embodiments, such that the state of each of the components is fully known by one of the modules.

As further examples of SON capability, the SON module 211 may request all eNodeBs connected to it via X2 interface to periodically or on demand to report Hardware Load, S1 Transport Network Load, Radio Resource Status, Downlink available capacity and Uplink Available Capacity. The virtualization server may analyze received Hardware Load status, S1 Transport Network Load status, Radio Resource Status, Downlink available capacity status and Uplink Available Capacity status may generate analytics, correlate them and take action to improve and orchestrate resource utilization across eNodeBs it is managing. Using generated analytics, the virtualization server determines current network bottlenecks & resource congestion and how to reduce future network bottlenecks & resource congestion, including balancing load across all eNodeBs.

EPC and RAN Functions

In some embodiments, EPC module 221 may contain EPC finite state machine module 222 and macro eNodeB table 223. EPC finite state machine module 222 may track the state of any messages or call flows being sent or received with a macro eNodeB, such as macro eNodeBs 205, 206. EPC FSM module 222 may, for example, determine whether a handover has been initiated by macro eNodeB 205, 206, as well as other functions. EPC FSM module 222 may also track which eNodeBs within the network are involved in communicating with the macro eNodeBs, and may perform network address translation by mapping incoming requests and messages from an eNodeB address external to the gateway 201 to an address internal to the gateway 201, using eNodeB table 223. In some embodiments the tracking and network address translation functions may be performed at the RAN module or in another module. Macro eNodeB table 223 may track all macro eNodeBs and any connections, bearers, tunnels, or calls open between an eNodeB internal to the gateway, such as eNodeBs 202 and 203.

In some embodiments, RAN module 231 may contain RAN finite state machine module 232 and eNodeB table 234. RAN module 231 is the counterpart to EPC module 221 on the side of the network inside the gateway. RAN FSM module 232 may track and receive messages and requests, and may track the state of the RAN node in any message exchange. eNodeB table 234 may include a mapping to from an eNodeB ID or cell ID to the ECGI ID used outside of the private network. In some embodiments, RAN module 231 may use eNodeB table 234 to perform network address translation, if applicable, on messages received by RAN module from eNodeBs 202, 203, so that the messages can be sent upstream to the EPC and/or core network. In some embodiments, network address translation is used at both RAN module 231 and EPC module 221, for connections initiated at the RAN and at the EPC, respectively.

In some embodiments, RAN module 231 may determine that an X2 connection may be terminated locally, without being sent outside the gateway, or even without being sent to the gateway at all. In those cases, RAN module 231 can instruct eNodeBs 202, 203 to perform direct X2 communication, as shown by the solid arrow between eNodeBs 202 and 203. In some embodiments, additional optimizations could be performed as well, such as identifying when multiple UEs are attempting handover from the same source cell to the same target cell. If multiple UEs are attempting a similar handover, the RAN module may coalesce, aggregate, hide, or otherwise optimize the handover, performing interworking and proxying as necessary. The RAN module may thus permit hiding of detail of X2-X2 handovers within the internal RAN network.

As RAN module 231 is in the data path for all S1 communications to the core network, including communications to MME 204, RAN module 231 may perform proxying and network address translation for the S1 connection, in addition to supporting the X2 connection, in some embodiments. RAN module 231 may also pass along any UE measurement reports received from UEs to either or both of UE module 241 and SON module 211.

In some embodiments, UE module 241 may contain UE finite state machine module 242 and S1/X2 handover mapping table 243. UE finite state machine module 242 may track states for call flows that are in process between a UE connected to one or more eNodeBs and either a core network node or a target eNodeB. For example, UE FSFM 242 may track when an X2 handover request message has not been responded to and may expire. UE FSFM 242 may also track X2/S1 handovers, in conjunction with S1/X2 handover mapping table 243. When an X2 handover request is received, UE FSFM 242 may, in some embodiments, determine whether a handover may be translated from S1 to X2, or vice versa, before the handover may continue. UE module 241 handles UE-related requests from both the RAN module 231 (from nodes internal to gateway 201) and from EPC module 221 (from nodes external to gateway 201).

Operation

In some embodiments, certain eNodeBs, such as macro eNodeBs, may be configured as peer eNodeBs. A peer eNodeB is an eNodeB that is a neighbor of another eNodeB; radio site surveying can identify peer eNodeBs for a given site before an eNodeB is placed. Configuration may be performed at virtualization server 201 that maps the global eNodeB ID of the macro eNodeB to its IP address that may be used for X2 association setup. Subsequent to configuration, in some embodiments, macro eNodeBs may be designated as peer eNodeBs via discovery by UEs, which report all neighboring eNodeBs in regular UE measurement reports.

In some embodiments, flags applicable to the NRT table may also be configured. The definition of these flags is as follows: no-x2: neighbor relation shall not use an X2 interface in order to initiate procedures towards the peer eNodeB; no-handover: neighbor cell relation shall not be used by the eNodeB for either S1 or X2 handover; and no-remove: neighbor cell relation for the peer eNodeB shall not be removed from the neighbor relation table.

In some embodiments, once an X2 connection has been set up between a mesh eNodeB and a macro eNodeB, and an appropriate proxy mechanism via the virtualization server is in place, the load indication and resource status reporting procedures are cell ID (ECGI)-based. The virtualization server may forward messages to either the mesh eNodeB or the macro eNodeB, as appropriate, based on the ECGI. Some embodiments may be limited to 255 cells because of the size limitations of the ECGI field. In some embodiments, since each mesh eNodeB implements a cell, the virtualization server may act as an eNodeB X2 endpoint for macro cells.

In some embodiments, reporting or X2AP load information messages can contain a list of cells that a macro eNodeB may be interested in, for example, for purposes of handover.

In some embodiments, a whole message is sent to all mesh eNodeBs. In other embodiments, only the relevant part of a message are sent.

For example, in Load Information X2AP message, the target cell-specific high interference indicator (HII) information is optional, with the rest of the message defining global source cell-specific information like overload and relative narrowband transmit power (RNTP) information. In some embodiments, this global info may be sent to all mesh eNodeBs when load information is received from one or more macro cells.

Interference Mitigation

In some embodiments, interference mitigation may be performed at power-on.

Upon power-on for the first time, interference mitigation may be performed by using one or more of the following methods: using radio emissions measurements at a mesh eNodeB to determine approximate downlink path loss from its neighbors; assuming a conservative noise plus interference power at the macro eNodeB's receiver, and further assuming symmetrical uplink and downlink, and then calculating a cell radius where a minimum level of uplink throughput can be achieved by the UE while at the cell border while keeping the expected interference power at the macro to be less than a configurable multiplicative factor of the previously assumed noise plus interference power at the macro eNodeB's receiver; corresponding to this cell radius, setting transmit power of the small cell/mesh eNodeB such that a pre-defined minimum downlink throughput can be achieved; and/or setting Pmax for the cell based on the computed radius.

In some embodiments, interference mitigation may be performed during operation. For example, one or more of the following X2-based methods may be used for interference coordination with the macro: a dynamic SON-based transmit power control method may be performed based on UE measurement reports from a plurality of nodes in the network; a mesh eNodeB may identify cell edge UEs based on a combination of timing advance and UE measurement reports; a mesh eNodeB may subscribe to uplink high interference indication (UL-HII) X2 messages from the macro, and mesh eNodeBs that are neighbors of this macro may avoid scheduling cell edge UEs on the resource blocks marked in the X2 message; a mesh eNodeB may subscribe to uplink overload indication (UL-OI) messages, wherein the mesh eNodeB does not schedule cell edge users on these resource blocks or may choose to leave the marked resource blocks unscheduled; a mesh eNodeB may subscribe to relative narrowband transmit power (RNTP) information from the macro, and on the downlink, the same eNodeB may avoid scheduling cell edge UEs on the resource blocks indicated in the RNTP information element; a mesh eNodeB may generate messages, such as RNTP, UL-OI, or UL-HII messages, towards its neighbors for coordination within a network of small cells; and/or a LTE access controller may implement a fractional frequency re-use method using non-X2 signaling within the private network.

In some embodiments, macro eNodeB Load Information (LI) messages may be handled as follows: a. Upon reception of HII limit the UL modulation and coding scheme (MCS) for the resource blocks (RBs) indicated in HII. Typically the highest uplink MCS is restricted to MCS20, corresponding to 16 QAM coding. MCS may be limited to MCS 12, which corresponds to QPSK with max code scheme. Along with this restriction, the restricted resource blocks may be assigned to UEs in the cell center area, defined as UEs having a reference signal received power (RSRP) of the macro less than a certain threshold; b. Upon receipt of an overload indication (OI) message, prohibit the use of RB's indicated as reported overloaded by Macro-eNodeB; and c. upon reception of a relative narrow-band transmit power (RNTP) message, take actions based on the threshold, such as limiting the downlink MCS for those RBs to a value that is determined by the transmit power indicated in the RNTP message.

For radio resource management, the load information message is forwarded to RRM by X2. The frequency of Load Information and Resource Status Indication messages puts throughput requirements on the Wi-Fi backhaul considering that one Virtual eNodeB at LAC can support up to 255 CWS's.

Protocol-Mapped Handover

In the LTE protocol, a handover may be initiated via either an S1 message (from an MME) or an X2 message (from an eNodeB). As described above, an X2 protocol handover is possible between two eNodeBs, including eNodeBs managed by a virtualization server. However, in some embodiments, a handover initiation received by the virtualization server in either of these protocols may alternatively be mapped to the other protocol, where appropriate. The mapping may be performed and/or stored at the UE module 241, in some embodiments. This is possible because the virtualization server acts as a protocol endpoint and produces its own protocol messages, and because the virtualization server is the gateway for both any macro eNodeBs and also the MME, from the perspective of a mesh eNodeB internal to the network. In some embodiments, the virtualization server may map X2 handover requests to S1 handover requests.

Handover from Macro to CWS (proxied by virtualization server), the Hand-In, may be supported via X2. Handover from CWS to Macro, the Hand-Out, may also be supported via X2. Handover between CWS's may be supported via S1. It should be noted that between CWS and virtualization server, S1 may be used for handover signaling. So, the virtualization server may do the conversion between S1 and X2 in either direction.

Currently the Handovers between CWS's managed by the same virtualization server are short circuited via virtualization server. Thus the handover signaling does not go till MME. CWS initiates the S1 Handover procedure and virtualization server determines the target CWS by looking at the last 8 bits of the target cell-id IE. If this cell is found then the handover is marked as non-pass through (i.e., it will not be passed to MME) and thus all the handover signaling is short-circuited at the virtualization server.

If the cell is not found by the virtualization server, then the handover is marked at pass-through handover and virtualization server proxies the handover signaling towards MME.

For X2 handovers, the CWS may continue to use the S1 handover procedures. However, if the virtualization server has an X2 connection towards the target eNodeB, the virtualization server can convert the S1 handover initiated by CWS into X2 handover, such that all the X2 handover signaling coming from target eNodeB may be remapped to S1 handover signaling towards CWS.

Although this will involve virtualization server in decoding/encoding S1 to and from X2, the amount of changes at CWS are minimized since it will be using the existing S1 handover functionality.

Thus CWSs are unaware of the type of Handover (X2/S1) carried out by virtualization server. For CWS, it is always an S1 Handover.

A Global eNodeB ID to EUTRAN Cell-id MAP will be maintained at RAN module. An entry into the map will be added as and when the SON establishes the X2 connections with peer X2 Endpoints. When X2 endpoint goes down, the corresponding entry will be deleted.

UE module will provide a Global eNodeB ID to EPC module with which EPC module will select the X2 endpoint for HO signaling.

UE Entry at the EPC module will contain the X2 endpoint handler till the time HO completes.

As an example, for an X2 handover request received at the virtualization server from a macro eNodeB, the virtualization server may map the request to an S1 handover request and may send the S1 handover request to a mesh eNodeB internal to the network, thereby providing S1 MME proxying. The MME UE S1AP ID information element may be generated locally at the virtualization server, since this information element is not present in the original X2 request. To track the handover request, the originally-received eNodeB UE X2AP ID may be stored in an S1/X2 handover mapping table, together with the new MME UE S1AP ID. The transport layer address of the new S1 request may be set to the uplink GTP tunnel endpoint. The S1 handover is predicated on the mesh eNodeB being anchored at the virtualization server. The advantages of this approach include offloading mesh eNodeB functions from the MME.

When performing the reverse mapping, from an S1 handover acknowledgement to an X2 acknowledgement, the UL GTP tunnel endpoint may be set at the S1-issuing MME to the GTPU endpoint at the virtualization server. This allows the virtualization server to decrypt and forward any information in the request. As well, for the target eNodeB to source eNodeB transparent container information element, the radio resource control (RRC) E-UTRA handover command as defined in TS 36.331 § 10.2.2 may be used.

Similarly, a hand-in request from a macro eNodeB to a mesh eNodeB may be received as an X2 handover request at the virtualization server and may be mapped to an S1 handover request for the mesh eNodeB.

A hand-out request from a mesh eNodeB to a macro eNodeB may be received as an X2 handover request at the virtualization server. No protocol mapping is needed, as the macro eNodeB supports X2 handovers, but various parameters, including addresses, location reporting information, and the handover restriction list, may be changed before the X2 handover request is passed to the macro.

Handovers between mesh eNodeB nodes may continue to be performed directly without intermediation by the virtualization server, using the X2 protocol.

Since no proprietary changes can be expected on third party eNodeBs, supporting them would mean adhering to standard X2 interface between the virtualization server and third party eNodeBs.

In some embodiments, the per M-eNodeB access side IP model implemented at the virtualization server may be able to support third party eNodeBs.

Security

Initially, in some embodiments, the KeNodeB to be used over the access stratum is derived by UE and MME separately. The MME sends KeNodeB in the Initial Context Setup Request to the eNodeB to be used for the UE for which the context is being setup. In handover scenarios, the target cell derives the KeNodeB using the KeNodeB* value supplied by source cell, target PCI and target cell frequency EARFCN-DL. KeNodeB* can be either the source cell KeNodeB or Next Hop (NH) key value derived by MME. At handover request, the MME increments the Nexthop chaining counter (NCC) and calculates corresponding NH (next-hop) value and supplies the same to eNodeB to be used immediately (in case of S1) or as a forward security key (in case of X2). In case of X2, the <NH, NCC> pair is sent by MME in the S1 Path Switch Acknowledge after the X2 handover is complete. This value may be saved and supplied by the eNodeB when it starts the handover process to a peer target eNodeB in X2 handover request. In case of X2, since MME is not involved in handover, on the first handover, target eNodeB uses a horizontal key derivation to the KeNodeB to be used in the cell since the <NH, NCC> pair is not available for forward security.

For macro to CWS Handover, in some embodiments, CWS may use the <NH, NCC> pair received in X2 Handover Request for calculating KeNodeB. It may store the <NH, NCC> received from MME in S1 Path Switch Ack and use it for forward security.

For CWS to Macro Handover, in some embodiments, For a UE that has done an original/initial attach at CWS, CWS may send the KeNodeB as KeNodeB* to M-eNodeB. For a previously Macro handed over UE, CWS may send the stored <NH, NCC> value received from MME (or passed on from previous CWS as explained in the next section) in X2 Handover Request in AS Security Information AVP to Macro-eNodeB.

For CWS to CWS handover, in some embodiments, CWS to CWS handover is intended to use S1 interface and not X2. Furthermore, the S1 Handover Required message from source eNodeB doesn't contain the <NH, NCC> values as it is expected to be calculated at MME and sent in S1 Handover Request to target eNodeB. Since CWS to CWS handover bypasses MME, there is a need to store the <NH, NCC> pair contained in X2 Handover Request when a new UE context is created at LAC due to hand in from Macro to CWS. This <NH, NCC> pair may be sent to target CWS in Security Context IE in S1 Handover Request message by LAC since the NCC value of the target CWS wouldn't match the Source CWS which has taken the hand in from M-eNodeB. The same would apply to the subsequent handover target CWS.

Call Flows

In the call flows below, it is assumed that when M-eNodeB requests an X2 setup with LAC for a particular CWS1, LAC sends information about all CWS as part of cell information since G-eNodeB-ID is same for all CWS handled by that LAC. Furthermore, the 3GPP spec indicates that information for all cells may be supplied by an eNodeB at X2 setup. Furthermore, the X2 configuration update procedure may indicate any change in Cell Info (add/delete/modify) to the connected eNodeB that it has just taken in use. TNL discovery of CWS addresses can be skipped if CWS X2 interface address is known beforehand.

Figure 3:
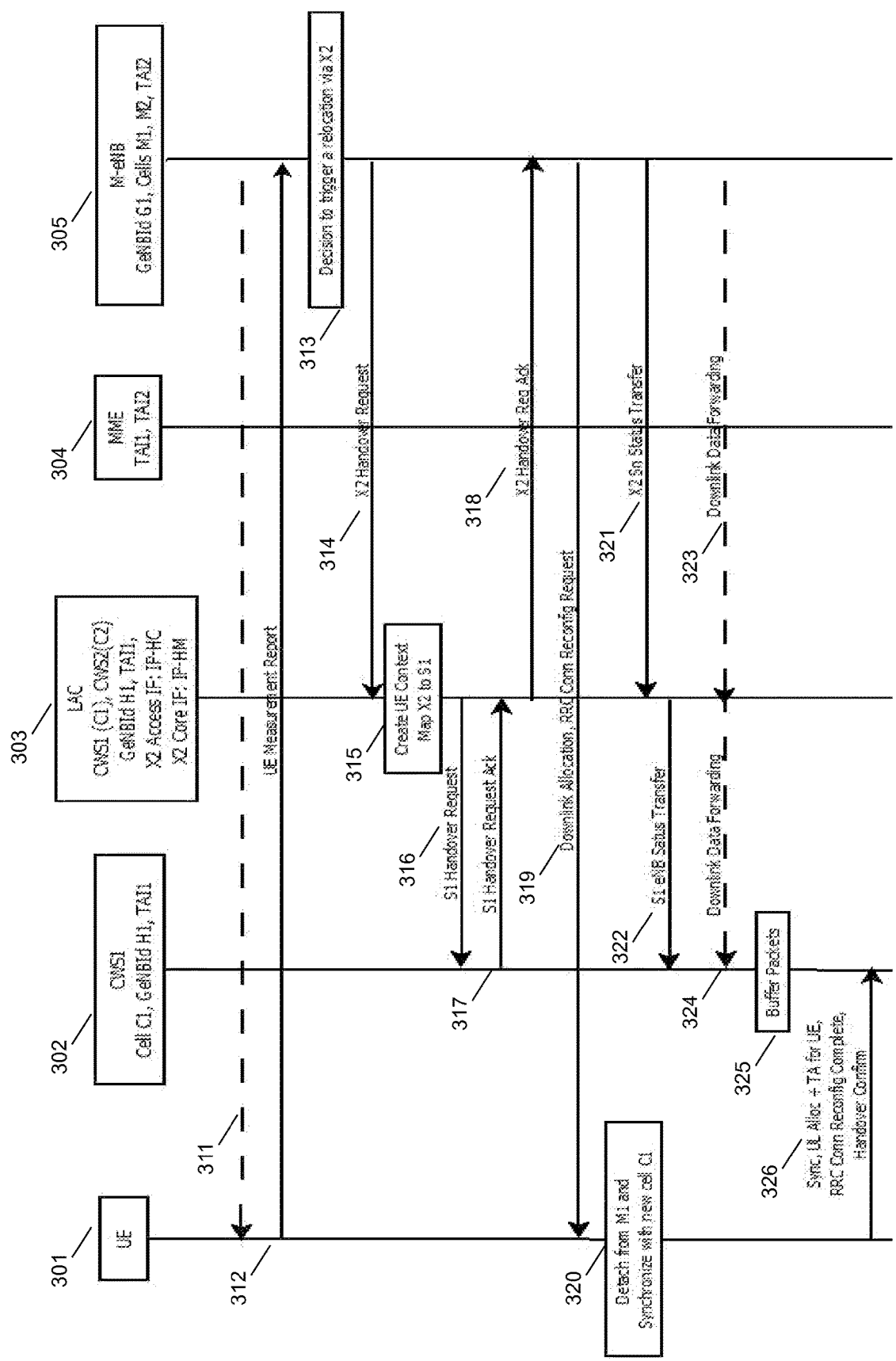
FIG. 3 is a call flow diagram of a representative handover call flow, in accordance with some embodiments.

FIG. 3 is a call flow diagram of a representative handover call flow, in accordance with some embodiments. UE 301, mesh base station CWS1 302, virtualization server LAC 303, MME 304, and macro eNodeB 305 are present. At step 311, macro eNodeB 305 is connected to UE 301. At step 312, UE 301 sends a measurement report to macro eNodeB 305, either because of a timer or because of changing network conditions. At step 313, macro 305 determines that a handover is desirable via X2 to CWS1 302. At step 314, a handover request is sent, intended for CWS1 302. The handover request is directed to LAC 303, as its virtual eNodeB address matches that reported by CWS1. At step 315, LAC 303 creates a UE context and prepares to convert the X2 protocol traffic into S1.

At step 316, LAC 303 sends an S1 handover request to CWS1 302, upon which CWS1 302 returns an S1 handover acknowledgement. At step 318, LAC 303 sends an X2 acknowledgement to macro 305. At step 319, the macro tells UE 301 that the connection is being moved (radio resource reconfiguration request). At step 320, the UE detaches from the macro and moves to CWS1 302. At step 321, concurrently with step 320, macro 305 sends UE 301's state via X2 to CWS1 302. The state is intercepted by LAC 303, which converts it into an S1 status transfer and sends it to CWS1 302 at step 322. At step 323, any persistent downlink data still remaining is sent via X2 to LAC 303, which forwards it to CWS1 302 at step 324. These packets are not delivered but are buffered at step 325 until the new UE-CWS connection is completed at step 326.

X2 Setup of CWS to LAC—at CWS Startup

In this approach, X2 is established between a CWS with other CWS/3rd Party eNodeBs and LAC at startup of the CWS. The X2 message load information is used to exchanging resource utilization information between CWS and LAC in either direction, such that X2 connectivity within the network internal to the gateway is maintained. The consequences of this approach are: (a) enhance cloud ANR to provide X2 setup triggers to the X2 GW module; (b) define X2 handling message routines in SON at the LAC that will process X2 Load indication messages into PRB bitmasks that can be conveyed to CWS over existing out of band signaling or S1 private IEs (by R4.0, it will be S1 private IEs); (c) elimination of effort to manage southbound X2 at LAC but addition of effort for S1<->X2 handover interworking.

X2 Setup of CWS to New Macro—LAC to Tell CWS to Set Up at Macro Detect Time (Send X2 Setup Request)

X2 setup response may contain another CWS cell C2. LAC to associate macro with C2 as well as C1, and C2 to be informed by eNodeB config update.

X2 Setup—Macro to CWS

If a M-eNodeB sends a X2 Setup Request with its cells M1 and M2 and neighbor list containing some of the CWS cells (C1), then the NRT may be updated with entries for these cells (C1, M1) and (C1, M2). Only the CWS cells detected as neighbors of the M-eNodeB served cells may be included as served cells in X2 Setup Response by LAC. If the neighbor list is empty in the X2 Setup Request and the neighboring CWS cells can't be identified, all CWS cells may be included as served cells by LAC in X2 Setup Response. The NRT table entry may be created only when the next X2 message like the X2 Load Information containing specific CWS cell information comes. If specific CWS cell information is missing in this message as well, the corresponding action can be applied to all cells or might also be ignored depending on the message. Alternatively, a failure response may be sent. The other alternative of sending the list of CWS cells present in the NRT might not be correct since, it is not known which CWS Cell M-eNodeB detected before sending X2 Setup Request to LAC. When CWS sets up a SCTP connection with LAC while creating X2 connection for Macro M-eNodeB1, would it initiate X2 Setup Request if the TNL discovery for Macro M-eNodeB2 yields the same LAC TNL address. This is not expected since a new X2 Setup request on the same SCTP connection is supposed to clear the previous associated information. In some embodiments, the LAC may give a different TNL address for purposes of creating an SCTP tunnel. The X2 Configuration Update messages may or may not have G-eNodeB-ID implying that the underlying SCTP association identifies the peer eNodeB. This creates a potential problem when updating cell info at CWS where the CWS is connected to multiple M-eNodeB via same SCTP connection to the X2-Proxy GW.

Macro to CWS—Multi eNodeB—IP Per M-eNodeB

In some embodiments, the LAC may respond to the S1 TNL discovery message from M-eNodeB1 and also create the X2 association with it. The LAC may also assign a M-eNodeB1 specific local IP. When M-eNodeB1 sends a Load Information message, LAC may identify the concerned CWS from the target cell information and initiate X2 setup with CWS over SCTP using the earlier chosen source IP. Note that both LAC and CWS may use the standard X2 port 36422 at their end. The same process may repeat for any new M-eNodeB attempting to connect to a CWS.

Macro to CWS—Multi eNodeB—Port Per M-eNodeB

In some embodiments, the MAYLAC may respond to the S1 TNL discovery message from M-eNodeB1 and also create the X2 association with it. In the method proposed in section above, LAC may also assign a M-eNodeB1 specific local port. When M-eNodeB1 sends a Load Information message, LAC may identify the concerned CWS from the target cell information and initiate X2 setup with CWS over SCTP using the earlier chosen source port. Note that CWS may use the standard X2 port 36423 at its end. The same process may repeat for any new M-eNodeB attempting to connect to a CWS.

CWS to LAC—No X2

In this approach, X2 is not established between CWS/3rd Party eNodeBs and LAC. The consequences of this approach are: (a) enhance cloud ANR to provide X2 setup triggers to the X2 GW module; (b) define X2 handling message routines in SON at the LAC that will process X2 Load indication messages into PRB bitmasks that can be conveyed to CWS over existing out of band signaling or S1 private IEs (by R4.0, it will be S1 private IEs); (c) elimination of effort to manage southbound X2 at LAC but addition of effort for S1<->X2 handover interworking.

X2 Setup Failure

If the X2 Setup with the CWS fails (may be due to malformed request), RAN module would not inform the SON module since there is no association formed between the two modules. If M-eNodeB sends a X2 Setup Failure message, the EPC module would invoke x2_setup_failed( ) API to SON module with the ASN message included.

eNodeB Configuration Update—CWS to Macro

If a CWS cell (C2) detects a neighbor cell (M1) for which the X2 association already exists with the controlling M-eNodeB, an X2 eNodeB Configuration Update may be sent to the controlling M-eNodeB with C2 as the added cell.

eNodeB Configuration Update—Macro to CWS

If an eNodeB Configuration Update is received at the LAC from M-eNodeB, the NRT may be updated with the new entries and subsequent actions triggered towards affected CWS. Again, the neighbor list received for each M-eNodeB cell may be used to find the corresponding CWS cells. Individual eNodeB Configuration Update messages may be sent to the affected CWS's by LAC with the corresponding Macro-eNodeB cell as the added/deleted cell.

LAC Reset, Macro Reset

The following call flow shows handling of both cases— LAC Initiated Reset and M-eNodeB initiated Reset. LAC might initiate a Reset Request to M-eNodeB when ageing timer expires in the NRT for its entries. This timer could be single global timer for all cells of an M-eNodeB.

LAC X2AP Module

For network side, SCTP associations may be mapped to Macro Global eNodeB ID. The mapping may be used to inform SON module when an X2 association goes down. For access side, SCTP associations may be mapped to CWS Ids. The mapping may be used to interact with SON module for exchanging messages. An X2 specific FSM in EPC module would be used to handle the X2 association management with the peer M-eNodeB. A list of peer M-eNodeB entries would be maintained over which the X2 FSM would be run. TNL Discovery may be triggered on receiving X2 association setup request from SON module. The X2AP module level association table may be searched to see if the IP can be resolved via peer-eNodeB config or not. If not, TNL discovery may be initiated.

LAC X2AP—SON Interface

Generally, access side request handlers identify target eNodeBs by cws-id, and network side request handlers by global eNodeB ID. Messages that traverse the LAC are translated from one to the other using a mapping table containing a mapping from global eNodeB ID to CWS ID.

CWS to CWS Handover

Currently, handover via S1 and via the LAC, as supported already, may be used. Since the required G-eNodeBID may be the same for all, this parameter may be ignored. Alternatively, this parameter may not be the same when viewed within the mesh network, as each mesh eNodeB may have its own eNodeB ID, in which case ordinary X2 handover may also be used. Also, if X2GW proxies all macro cells towards CWS—meaning—indicates ownership of these cells via eNodeB Configuration Update, architecture similar to intra-eNodeB cells/multi-sector may apply. This means that in this architecture, the whole network, macro included, would appear as cells of a single eNodeB identified by G-eNodeB-ID of LAC.

CWS to Macro Handover

The steps for this handover may include: 1. CWS sends S1 Handover Required to RAN module over S1 interface; 2. RAN module takes a look at the target cell-id inside the source to target transparent container. With this information, the RAN module looks up inside the X2 Global eNodeB ID map. If the RAN module finds an entry, it indicates that the LAC has an X2 connection with the eNodeB. Thus, this handover will be carried over X2 by LAC instead on S1. RAN module forwards the S1 Handover message to UE module with X2 HO Required flag set to true; 3. At the UE module, the UE will be in ACTIVE state. Upon receiving the S1 HO message with the X2 HO required flag set to true, X2 Handover request event will be posted to the UE FSM. The handler for this event will do the S1 to X2 conversion of the message and send the X2 HO Request message to EPC module. The UE FSM will move to X2HO_PREPARATION state. Also the X2 Relocation Preparation timer will be started upon moving into the X2HO_PREPARATION state; 4. EPC module will select the X2 endpoint based on the Global eNodeB ID and proxy the X2 HO request to Macro 5. Macro responds with X2 HO Response 6. EPC module sends the X2 HO response to appropriate UE module instance handing the UE; 7. X2 Handover Response event will be posted to UE FSM which will be in the X2HO_PREPARATION state. This will take the UE FSM to X2HO_EXECUTION state. UE module will stop the Relock prep timer. The handler of the event will convert the X2 Handover response to S1 Handover Command. X2 Relock overall timer will be started. The S1 Handover Command will be sent to RAN module 8. RAN module will send the S1 HO Command to the CWS; 9. CWS initiates S1 SN Status Transfer towards RAN module on the S1 link 10. RAN module proxies the S1 SN Status Transfer to UE module 11. UE module will convert the S1 SN Status Transfer to X2 SN Status Transfer and send the message to EPC module; 12. EPC module passes the X2 SN Status Transfer message to Macro; 13. Macro initiates a UE Context Release 14. EPC module send the UE Context Release to UE module 15. UE module sends the UE Context Release to RAN module. The Relock overall timer is stopped; 16. RAN module sends the UE Context Release to CWS 17. CWS initiates a UE Context Release Complete response; 18. RAN module sends the UE Context Release to UE module 19. UE module cleans up the UE resources. It also does appropriate signaling towards the demultiplex tasks so that the information regarding the UE is cleaned; 20. UE module to install GTPU flows for forwarding data to target cell.

Macro to CWS Handover

The steps for this handover may include: 1. Macro eNodeB initiates X2 Handover Request towards EPC module; 2. EPC module passes the X2 Handover Request to UE module 3. UE module creates a call for the new incoming UE. The X2 Handover Request event is passed to the newly created UE FSM which is in IDLE state. The event handler for this event extracts the target cell-id from the X2 Handover Request. Also X2 Handover request is converted to S1 Handover Request and the same is sent to RAN module. The UE FSM moves to X2HO_PREPARATION state; 4. RAN module finds the target CWS with the cell-id information provided by UE module. The RAN module proxies the request to the target CWS; 5. CWS responds with S1 Handover Request Ack; 6. S1 HO Request Ack is passed on the UE module by RAN module 7. S1 Handover Ack event is posted to the UE FSM which is in X2HO_PREPARATION state. The handler for this event converts the S1 Handover Ack to X2 Handover Ack. The X2 Handover Ack is passed on to EPC module. The UE FSM moves in the X2HO_EXECUTION state; 8. EPC module passes on the X2 Handover Ack to Macro; 9. Macro sends X2 SN Status transfer 10. EPC module sends X2 SN Status Transfer to UE module 11. UE module convers X2 SN Status Transfer to S1 SN Status Transfer 12. S1 SN Status Transfer is passed on the CWS by RAN module 13. CWS initiates S1 Handover Notify 14. RAN module sends the S1 Handover Notify to UE module. UE module moves the UE FSM to active state 15. UE module sends S1 Path Switch request to EPC module 16. EPC module sends the S1 Path Switch request to MME 17. MME sends S1 Path Switch Ack to EPC module 18. EPC module sends the S1 Path Switch Ack to UE module 19. UE module sends a UE Context release to EPC module 20. EPC module sends the UE Context Release request to Macro; 21. UE module to install GTPU flows for receiving forwarded data from source cell.

Mesh Hardware

Figure 4:
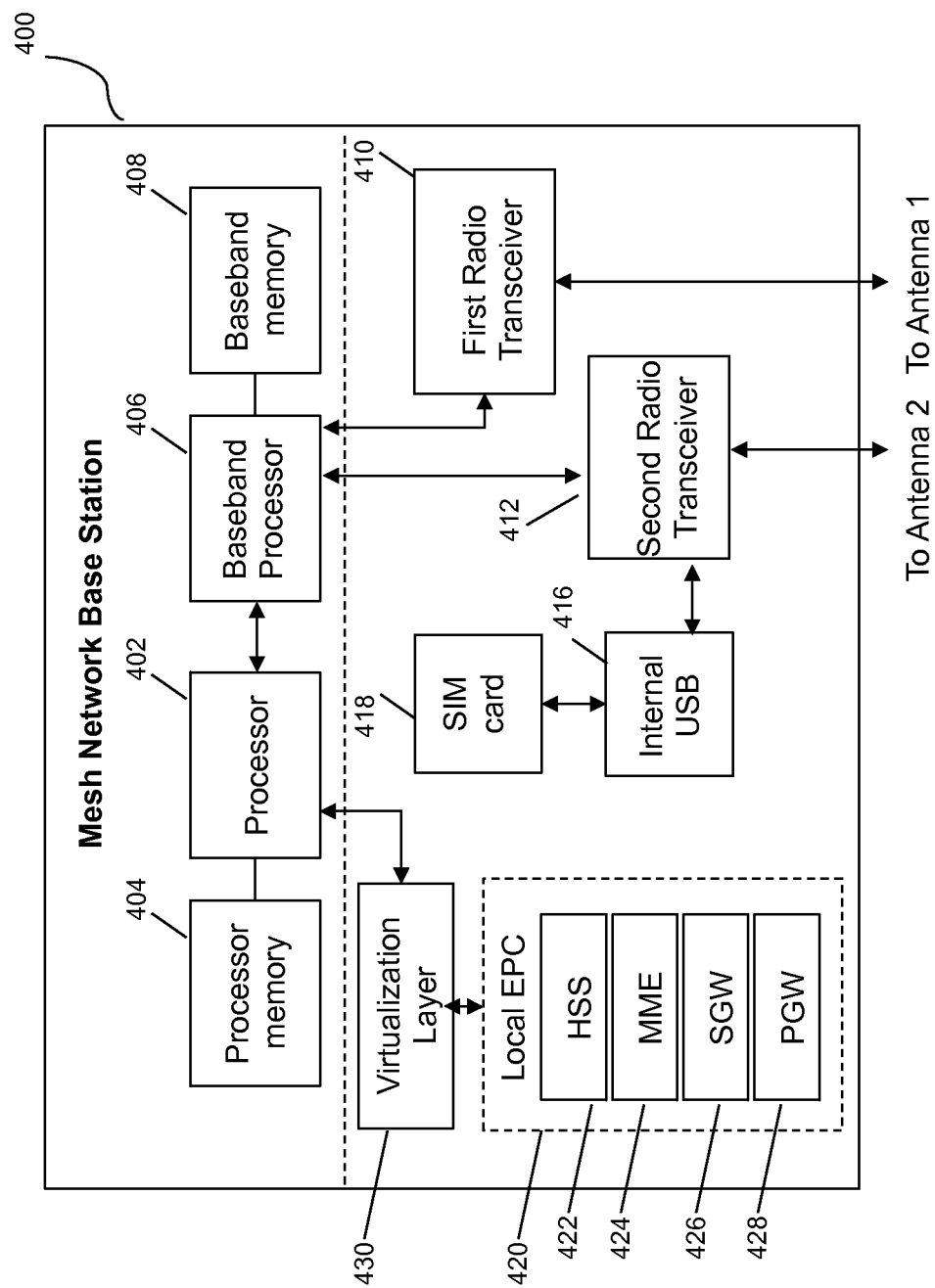
FIG. 4 is a schematic diagram of a mesh network base station, in accordance with some embodiments.

FIG. 4 is a schematic diagram of a mesh network base station, in accordance with some embodiments. Mesh network base station 400 may include processor 402, processor memory 404 in communication with the processor, baseband processor 406, and baseband processor memory 408 in communication with the baseband processor. Base station 400 may also include first radio transceiver 410 and second radio transceiver 412, internal universal serial bus (USB) port 416, and subscriber information module card (SIM card) 418 coupled to USB port 414. In some embodiments, the second radio transceiver 412 itself may be coupled to USB port 416, and communications from the baseband processor may be passed through USB port 416.

A virtualization layer 430 may also be included for mediating communications with an evolved packet core EPC, specifically including the core network EPC (not shown) and local evolved packet core (EPC) module 420.

Local EPC 420 may be used for authenticating users and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Virtualization layer 430 and local EPC 420 may each run on processor 402 or on another processor, or may be located within another device.

Processor 402 and baseband processor 406 are in communication with one another. Processor 402 may perform routing functions, and may determine if/when a switch in network configuration is needed. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an operator EPC is available, local EPC 420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

Alternatives

In the present disclosure, the words "eNodeB" or "eNodeB" are used to refer to a cellular base station. However, one of skill in the art would appreciate that it would be possible to provide the same functionality and services to other types of base stations, specifically to home eNodeBs (HeNodeBs), as well as any equivalents.

In the present disclosure, the words "federated," "virtualized," "proxy" or "proxied" may be viewed as aspects of the same concept. For example, it may be understood that the federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A gateway for X2 interface communication, comprising:
   a single X2 endpoint for a plurality of radio access networks, further comprising:
      an X2 internal interface for communicating with, and coupled to, a first radio access network (RAN) node in a private RAN, and
      an X2 external interface for communicating with, and coupled to, a destination X2 node coupled to the first RAN node via the gateway,
      the X2 external interface providing a single X2 endpoint for enabling the destination X2 node to interact with the first RAN node via the gateway; and
   a state modeling module for modeling operational state of the first RAN node and the destination X2 node, the state modeling module configured to:

use the operational state to provide X2 interworking between the first RAN node and the destination X2 node, and interrupt X2 connections by masking signals not required to be transmitted outside the private RAN while allowing X2-to-X2 signals inside the private RAN, the first RAN node permitting a first user equipment (UE) to connect to a first cellular core network using a first radio access technology (RAT), and permitting a second UE to connect to a second cellular core network using a second RAT.

2. The gateway of claim 1, further comprising a user equipment (UE) state modeling module for maintaining X2 signaling associations and transactions for incoming and outbound handovers.

3. The gateway of claim 1, further comprising a self-organizing network (SON) module for determining whether to set up direct X2 connections between RAN nodes that bypass the gateway.

4. The gateway of claim 1, further configured to communicate with an upstream self-organizing network (SON) server, wherein the upstream SON server is configured to coordinate interference mitigation.

5. The gateway of claim 1, further comprising a self-organizing network (SON) module configured to discover a new X2 interface and to discover a presence of a new RAN node.

6. The gateway of claim 1, wherein the plurality of RAN nodes are moving eNodeBs, and the gateway further comprising a self-organizing network (SON) module configured to detect neighboring cells and configured to perform interference mitigation.

7. The gateway of claim 1, wherein the plurality of RAN nodes are eNodeBs.

8. A method for virtualizing X2 interface communication at an X2 gateway, comprising:

grouping two or more radio access network (RAN) nodes in a private RAN into a single individual X2 endpoint for X2 management;

advertising a total number of neighbors at the X2 gateway calculated based on all neighbors seen by each of the two or more RAN nodes and independent of a number of neighbors supported by any of the two or more individually;

grouping neighbors individually associated with each of the two or more RAN nodes based on network management parameters and physical proximity;

communicating with the two or more RAN nodes and with a destination X2 node coupled to the two or more RAN nodes via the X2 gateway;

modeling operational state of the two or more RAN nodes and the destination X2 node; interworking X2 signaling between the two or more RAN nodes and the destination X2 node; and interrupting X2 connections by masking signals not required to be transmitted outside the private RAN while allowing X2-to-X2 signals inside the private RAN, wherein the X2 gateway is situated between the two or more RAN nodes and a core network, thereby providing virtualized X2 interface communication between the two or more RAN nodes and the core network.

9. The method of claim 8, further comprising:
maintaining a neighbor table with all neighbors seen by each of the two or more RAN nodes;

sending different parts of the neighbor table to each of the two or more RAN nodes;

modifying the neighbor table to cause each RAN node of the two or more RAN nodes to receive a part of the neighbor table with a limited set of X2 entries independent of a number of neighbors seen by the each RAN node; and interworking X2 signaling between one of the two or more RAN nodes and another of the two or more RAN nodes, based on network condition criteria.

10. The method of claim 9, wherein the network condition criteria comprise a comparison of signaling latency of a direct link between the two or more RAN nodes and a link between the one of the two or more RAN nodes and the X2 gateway.

11. The method of claim 8, further comprising causing X2 signaling to be performed between the two or more RAN nodes without proxying.

12. The method of claim 8, further comprising dynamically changing advertised load information at a scheduled maintenance time for preventing incoming handovers to RAN nodes scheduled for maintenance downtime.

13. The method of claim 8, further comprising converting X2 handover requests to S1 handover requests.

14. The method of claim 8, further comprising maintaining a management table of a relationship, a topology, and a geographic location of each of the two or more RAN nodes, and sending X2 interface messages to update the management table.

15. The method of claim 8, further comprising receiving messages from the two or more RAN nodes with one of management information and real-time interference mitigation information.

16. The method of claim 8, further comprising encrypting a link between the X2 gateway and the two or more RAN nodes.

17. The method of claim 8, further comprising authenticating each of the two or more RAN nodes to determine whether a connection to the X2 gateway is authorized.

18. The method of claim 8, further comprising: requesting utilization information from the two or more RAN nodes; generating resource utilization analytics for the two or more RAN nodes; and managing resource utilization for the two or more RAN nodes, wherein utilization information is at least one of backhaul capacity, access network capacity, a number of connected mobile devices; and a number of active connected mobile devices.

19. A system for X2 interface communication, comprising:

two or more radio access network (RAN) nodes; and an X2 gateway situated between the two or more RAN nodes and a core network, the X2 gateway further comprising instructions that, when executed at the X2 gateway, cause the X2 gateway to perform:

grouping the two or more RAN nodes in private RAN into a single individual X2 endpoint for X2 management;

advertising a total number of neighbors at the X2 gateway calculated based on all neighbors seen by each of the two or more RAN nodes and independent of a number of neighbors supported by any of the two or more RAN nodes individually;

grouping neighbors individually associated with each of the two or more RAN nodes based on network management parameters and physical proximity;

communicating with the two or more RANs and with a destination X2 node coupled to the two or more RAN nodes via the X2 gateway;

modeling operational state of the two or more RAN nodes and the destination X2 node;

interworking X2 signaling between the two or more RAN nodes and the destination X2 node; and interrupting X2 connections by masking signals not required to be transmitted outside the private RAN while allowing X2-to-X2 signals inside the private RAN, thereby providing virtualized X2 interface communication between the two or more RAN nodes and the core network.

* * * * *